US006681223B1

United States Patent
Sundaresan

(10) Patent No.: US 6,681,223 B1
(45) Date of Patent: Jan. 20, 2004

(54) SYSTEM AND METHOD OF PERFORMING PROFILE MATCHING WITH A STRUCTURED DOCUMENT

(75) Inventor: Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 09/626,690

(22) Filed: Jul. 27, 2000

(51) Int. Cl.[7] .............................................. G06F 17/30
(52) U.S. Cl. .................. 707/6; 707/3; 707/5; 707/100; 715/513; 715/517
(58) Field of Search .......................... 707/6, 3, 5, 513, 707/517, 100

(56) References Cited

U.S. PATENT DOCUMENTS

| 6,014,680 | A | * | 1/2000 | Sato et al. .................... 707/513 |
| 6,272,467 | B1 | * | 8/2001 | Durand et al. .................. 705/1 |
| 6,434,550 | B1 | * | 8/2002 | Warner et al. ................. 707/3 |
| 6,510,434 | B1 | * | 1/2003 | Anderson et al. ........... 707/100 |
| 2002/0116371 | A1 | * | 8/2002 | Dodds et al. ................... 707/3 |

OTHER PUBLICATIONS

"Cybuy Brings the Impulse Buy Online," available at URL: http://www.marketingcomputers.com/news/9908/cybuybri-.asp, printed on Jul. 24, 2000.

* cited by examiner

Primary Examiner—Kim Vu
Assistant Examiner—Chongshan Chen
(74) Attorney, Agent, or Firm—Samuel A. Kassatly

(57) ABSTRACT

A profile matching system and associated method match the path expressions in a structured or semi-structured document, such as an XML document, to an indexed resource. The system, having assigned weighting values to the elements in the index, maps the document path expressions and attempts to match them to the index elements according to a predetermined schema. The system is comprised of an indexing module that maps the document and identifies its content attributes, and a matching module that matches the document content attributes to weighted elements of an index. The system defines the attribute or set of attributes in the schema that result in a match. The matching criteria are identified in a map specification file that specifies the specific qualification criteria. The indexing module uses the map specification information to produce efficient indices from XML document. The matching module uses a match specification language (MSL) and a match operator. Each rule in the MSL is a pair of path expressions: one for the source document and one for target document or index.

37 Claims, 3 Drawing Sheets

SYSTEM AND METHOD OF PERFORMING PROFILE MATCHING WITH A STRUCTURED DOCUMENT

FIELD OF THE INVENTION

The present invention relates to the field of data processing, and particularly to a software system and associated method for use with a search engine, to search data maintained in systems that are linked together over an associated network such as the Internet. More specifically, this invention pertains to a computer software product for generating profile matches between a structured document and web documents.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. Due to the vast number of WWW sites, many web pages have a redundancy of information or share a strong likeness in either function or title. The vastness of the WWW causes users to rely primarily on Internet search engines to retrieve information or to locate businesses. These search engines use various means to determine the relevance of a user-defined search to the information retrieved.

A typical search engine has an interface with a search window where the user enters an alphanumeric search expression or keywords. The search engine sifts through its index of web pages to locate the pages that match the user's search terms. The search engine then returns the search results in the form of HTML pages. Each set of search results includes a list of individual entries that have been identified by the search engine as satisfying the user's search expression. Each entry or "hit" includes a hyperlink that points to a Uniform Resource Locator (URL) location or web page.

A significant portion of the WWW documents today are authored in HTML, which is a mark-up language that describes how to display page information through a web-browser and to link documents up to each other. HTML is an instance of SGML (Standardized Markup Language) and is defined by a single document schema or Document Type Definition (DTD). The document schema puts forth a set of grammatical rules that define the allowed syntactical structure of an HTML document. The schema, or structure of HTML pages, is typically consistent from page to page.

Currently, Extensible Markup Language (XML) is gaining popularity. XML, which is a subset of SGML, provides a framework for WWW authors to define schemas for customized mark-up languages to suit their specific needs. For example, a shoe manufacturer might create a "shoe" schema to define an XML language to be used to describe shoes. The schema might define mark-up tags that include "color", "size", "price", "material", etc. Hence, XML documents written in this shoe language will embed semantic, as well as structural, information in the document. For example, a shoe XML document uses the mark-up tag "color" to indicate that the shoe is "blue".

One advantage of XML is that it allows the efficient interchange of data from one business to another (or within the business itself). A business may send XML data that conforms to a predefined schema to another business. If the second business is aware of the first business's schema, it may use a computer program to efficiently process the data. To enable this efficient data interchange and processing, XML requires that standard and high-quality schemas be developed and conformed to, by XML documents.

As noted, the XML framework allows for the definition of document schemas, which give the grammars of particular sets of XML documents (e.g. shoe schema for shoe-type XML documents, resume schema for resume-type XML documents, etc.). The XML framework also puts forth a set of structural rules that all XML documents must follow (e.g. open and close tags, etc.). Moreover, it is possible for an XML document to have no associated schema. If a document has an associated schema, the schema must be specified within the document itself or linked to by the document.

Information about the quality of an XML document may be inferred by its conformance with the rules put forth by this XML framework. An XML document is said to be "valid" if it has an associated schema and conforms to the rules of the schema. An XML document is said to be "well-formed" if it follows the general structural rules for all XML documents. Ultimately, a high quality document has a higher probability of being both "valid" and "well-formed" than a low-quality document.

In addition, like HTML documents, XML documents form a hyperlinked environment in which each XML document that has an associated schema provides a link to the schema (if the schema is not defined within the document itself). Moreover, each XML document, using various mark-up structures, such as XLink or XPointer, may link up to other XML structures and XML documents. Unlike the HTML environment, however, the schemas of each hyperlinked document may vary from document to document. A document that satisfies one particular schema can point to a document that satisfies a different schema. Further, two documents with different schemas can point to a document with a third schema. The quality of each schema may vary significantly.

A search of web pages using keywords, in most cases, returns an over-abundance of search-results. For example, a search for "Harvard" might result in an excessive number of web pages. Search engines face the challenge of matching these results to a profile provided by the user. Text-based matching alone will often miss some pages that are relevant to the search.

Harvest, is a program that tries to solve the robotic copying problem by indexing each site rather than copying its entire contents. Using Harvest, a web site can automatically produce a concise representation of the information on its site. This informational snapshot is then provided to interested crawlers, avoiding congestion on the server and slowing down the Internet. One Harvest concept of an automatically generated information snapshot index is known as metadata and written in a language known as Summary Object Interchange Format (SOIF). SOIF extracts such details as title, author's name, data type, and if one is available, the abstract from a web site. In the case of text files, all the entire text is included.

Webcasting, or Internet push, automatically delivers information to the users based on user profiles. Information frequently updated and of regular interest to the users becomes a prime target for webcasting delivery such as headline news and stock quotes.

One of the main problems facing webcasting is the lack of sufficient support for personalization in that a subscribed channel often contains a significant amount of information irrelevant to the users' interest. For example, users cannot customize their subscription to receive only information about their favorite teams when subscribing to a sports channel. Moreover, the bandwidth wasted by delivering irrelevant content exacerbates the burden on network infrastructure, preventing widespread deployment.

Therefore there still remains a reed for a solution that enables users to filter subscribed channels according to their needs in an individualized profile, and more importantly matching profiles against available content on the server side. Thus, only information pertaining to the user's personal interest needs to be displayed and delivered over the network, significantly enhancing usability while reducing network traffic.

The Grand Central Station (GCS) project is more than a search engine. GCS combines both information discovery and webcasting-based information dissemination into a single system. GCS builds a profile of the user and keeps him or her informed whenever something new and relevant appears on the digital horizon. The GCS system generally includes two main components. The first component constantly gathers and summarizes new information in the manner of a robotic crawler. The second component matches this information against the profiles of individual users and delivers it to a specified location, computer, or electronic device.

One aspect of GCS is that it is not limited to interacting with the user's desktop computer. GCS technology also pushes the information to devices such as Personal Digital Assistants (PDAs). As an example, a PDA owner might check the latest sports scores, traffic conditions and weather on the way home from work. The concept of having information available as-needed "just-in-time information", in analogy to the just-in-time (JIT) manufacturing concept. The search engines of GCS that look for information on sales figures, airport directions, patent citations and box scores are computer programs running on workstations termed gatherers and are derived from the University of Colorado's Harvest archival computer indexing system. To handle the information growth, GCS splits up the task of searching among several gatherers.

The GCS Gatherer can gather information from most common sources such as HTTP, FTP, News, database, and CICS servers, and summarizes data in a variety of formats such as HTML, GIF, Power Point, PostScript, VRML, TAR, ZIP, JAR, Java Source, JavaBeans, and Java class files. Represented in the XML format, a GCS summary contains the metadata for each gathered item and its salient features that are useful for search purposes. This allows the users to search diverse information with uniform queries.

GCS broadens the scope of webcasting by making data from anywhere in any format available as channel content. It also provides fine-grain personalization capabilities for the users to specify filters in any subscribed channel. The heart of GCS webcasting is the profile engine, which maintains a large profile database and matches it against incoming data received from GCS collectors. Data satisfying certain profiles will be automatically delivered to the corresponding users. Users interact with the GCS client to subscribe to web channels, specify filters to personalize a subscribed channel, and display delivered information in various forms. The profile engine consults the channel database to automatically compile data into a hierarchy of channels. System administrators can define channels using the channel administration tool according to the specific needs from where the system is deployed.

The gatherers collect all the available information. Most of the search engines currently available on the Internet work in one of two ways. "crawlers," AltaVista® and HotBot®, try to visit every site on the web, indexing all the information they find. The information provided by searches, on sites built by crawlers, suffers from an overload syndrome, typically producing too much irrelevant data.

On the other hand, a hierarchical engines may suffer from the opposite problem in that they may miss information that does not fit into their manicured schema. Hierarchical engines are akin to card catalogs. A staff of librarians constantly scans information collected about websites and places sites into an information hierarchy.

The GCS uses a crawler designed to retrieve obscure information that other search engines miss. The GCS crawler can communicate using most of the popular network protocols, which enables it to access information from a variety of data sources such as Web servers, FTP servers, database systems, news servers and even CICS transaction servers. CICS is an IBM application server that provides industrial-strength, online transaction management for mission-critical applications. The GCS crawler is designed to track file systems on machines in dozens of formats that are not commonly considered a part of the World Wide Web lexicon. This data can take the form of corporate presentations, database files, Java byte code, tape archives, etc.

The crawler passes the information that it discovers to the second stage of the gatherer. This stage is called the recognizer, and distinguishes the different kinds of information (i.e., database files, web documents, emails, graphics or sounds) the gatherer has unearthed. The recognizer filters the information to remove irrelevant material before transmitting it to the summarizer.

The summarizer is a collection of plug-in programs in which the appropriate program is "plugged in" to handle a particular data type, that takes each of the data types the recognizer can identify and produces a summary represented in a metadata format known as the extended Markup Language/Resource Discovery Format (XML/RDF), an emerging standard for metadata representation. The metadata for a web page, for example, might contain its title, date of creation and an abstract if one is available, or the first paragraph of text if it is not. As new programs are developed that are programmed to understand document types, they may be incorporated into the open architecture of GCS.

Regardless of the data type, typically, all XML summaries look similar, which facilitates their collection, classification, and search. A Web server associated with each gatherer makes the XMLs available to a central component called the collector. From the XMLs, the collector creates a database that is essentially a map of the digital universe. The collector co-ordinates the work of the gatherers so as not to repeat work. For example, when the gatherer looking for information in North America comes across a link to Japan, it informs the collector, which passes this information on to the Japan gatherer. Gatherers may be assigned by a GCS administrator to specific domains in the digital universe, but over time they may migrate dynamically to distribute the overall load of the system.

The gatherers and the collector make up the GCS search engine. The power of GCS lies in its ability to match information to the interests and needs of users. A program known as a profile engine exercises this task. Starting with the user's queries, it constructs information profiles that it continuously matches against the incoming information. As relevant material is found, it distributes them to administration servers that deliver them to the client's desktop computer or PDA.

Commercially available systems push channels of information to a user's desktop using a browser available at http://www.entrypoint.com. However, those channels are predefined, broad and unfiltered. GCS users can create channels that are as narrow or as broad as they wish. As the user switches from channel to channel, the information scrolls by in "tickers," similar to the stock marker ticker tapes.

The quality of the information delivered by GCS improves with use. This advance stems from a concept known as a relevance tracker. However, like all search engines, GCS inevitably delivers a lot of information that may be unrelated to the initial query. To address this problem, GCS includes a learning engine to analyze information that the user accepts and rejects, to refine queries and cut down on irrelevant provision of data.

Two forms of information transfer on the Internet are known as push and pull. A push is a one time definition or query that elicits a vast number of results, forcing the questioner to spend time sifting through piles of irrelevant information in quest of the required answer. The technical definition of push is any automatic mechanism for getting information off the web from the users perspective. A pull is a very specific query specification that may be too specific to pull in the precise information required.

Push means that new information is delivered or retrieved automatically from a remote computer to the user's computer. Information does not need to be updated manually on a regular basis. Grand Central Station technology is designed ultimately to allow users to both pull and push information on the web. Its advantage lies in the ability to tailor its searches to the requirements of individual users.

Unified messaging is another example of push-pull technology, and represents the convergence of e-mail, fax, and voice mail technology. A message can start as a fax and be converted into an e-mail message for delivery to the in-box of a mail server or an e-mail message can be transmitted to a fax number. Some services convert e-mails to voice messages so the messages can be heard over the telephone as a voice mail. This illustrates the multimedia nature of a push-pull style for information delivery through e-mail text, fax, images or audio presentation.

Java® is designed as a universal software platform which is currently being used to build streamlined applications that can easily be distributed across networks, including the Internet and corporate intranets. Appropriately equipped users download Java® "applets" and run them on their personal computers, workstations, or network computers.

GCS represents a good example of a Java®-developed tool, and an "intelligent agent" that crawls through all sections of the Internet searching for user-specified information. After automatically filtering, collecting and summarizing this information, GCS brings it to the attention of the user on a computer or a PDA.

Numerous indexing systems, such as freewais-sf, are available on the Internet. Freewais-sf has the ability to conduct field searching and documented relevance ranking. Harvest is another indexing system which is a modular system of applications consisting primarily of a "gatherer" and a "broker." Given URLs or file system specifications, the gatherer collects documents and summarizes them into a format called SOIF (Summary Object Interchange Format). SOIF is a meta-data structure. The broker's task is to actually index the SOIF data. In its present distribution, brokers can index the SOIF data using SWISH or WAIS techniques. Harvest's strength lies in its ability to easily gather and summarize a wide variety of file formats. Harvest provides indexed access to well and consistently structured HTML documents.

Profile matching enables the creation of an "ideal" personality profile against which job applicants are compared. Studies have shown that those job applicants who most closely match the "ideal" profile are the most productive workers and experience lower stress when performing the job. Psychologists comment on specific factors relevant to the job which should be considered when making employment decisions and can provide a list of interview prompts based on the differences between the "ideal" and candidate profiles. Profile matching is the most cost-effective method of checking a candidate's suitability for a given role, and is ideally suited to screening large numbers of applicants.

The market of web-based recruiting is expected to grow significantly. Websites like monster.com, hotjobs com, and careercentral.com provide facilities to register, post resumes and jobs, and search for jobs among other things. These portals provide facilities to tailor personal resumes in looking for job matches. Notification concerning job matches are performed typically through email. A centralized server is used to store both personal and job posting data. Job and personnel matching are believed to be performed through keyword matching. Personal data resides on a central server and the user exercises little or no control over the matching process.

There is therefore a long felt and still unsatisfied need for an enhanced profile matching system and method that provide accurate matches.

SUMMARY OF THE INVENTION

The present profile matching system and method satisfy this need by matching the path expressions (i.e., profile matching) in a structured or semi-structured document, such as an XML document (e.g. a resume with headings), to an indexed resource (i.e., an index). The system, having assigned weighting values to the elements in the index, maps the document path expressions and attempts to match them to the index elements according to a predetermined schema. If needed, the system converts the document schema to that of the index, in order to harmonize the schemas, thus facilitating the mapping and matching process.

The foregoing and other features of the present invention are realized by a profile matching system comprised of an indexing module that maps the document and identifies its content attributes; and a matching module that matches the document content attributes to weighted elements of an index.

As an example, the system considers the schema of a job applicant's resume (the document to be mapped) and the weighted index elements of the job posting. For every attribute in the resume schema, the system defines the attribute or set of attributes in the job schema that result in a match. The matching criteria are specified in a map specification file that specifies the specific qualification criteria for a job applicant seeking a particular job. This basically requires taking into account the important attributes of the job description and determining if the applicant possesses matching qualifications.

The indexing module uses the map specification information to produce efficient indices from the "resume" XML document. Another instance of the indexing component produces efficient indices from the "job" XML posting or document. The matching module is a driver based upon the map specification file that navigates the resume index document and the job index document to define matches.

The matching module uses a match specification language (MSL) and a match operator. Each rule in the MSL is a pair of path expressions: one for the source document (i.e., resume) and one for target document or index (i.e., job). As an illustration, for a rule r in the MSL, a source path expression sr, a target path expression st, and a match operator m, a match occurs if m(sr, st)=true. In addition, each rule may have a weighting factor. The weighting factor specifies the weight of this rule against other rules in the specification file. The weighting factor can be a real number between 0 and 1. The matching process basically processes the rule specification against the index files of the source and the target documents, and cumulatively weights the rule matches, and identifies an overall match criteria for each target document.

In the example above, as a new job applicant submits his or her resume to a web site, the matching module matches the resume using the match specification file against all the available job postings. As new job postings are added, the matching module incrementally matches them to previously matched resumes. As new resumes are added, the matching module matches them against existing job postings. Every time the applicant logs to the web site, the system shows provides him or her with a dynamically generated personalized listing of the most current top job postings matching his or her qualifications.

Although the profile matching system and method are described in connection with resumes and job postings for illustration purpose only, it should be amply clear that the invention is not limited to this specific application and that the invention can be applied to, and adapted by various other applications, including but not limited to applications where pairs of entities (e.g. books and book readers) need to be matched.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

Figure 1:
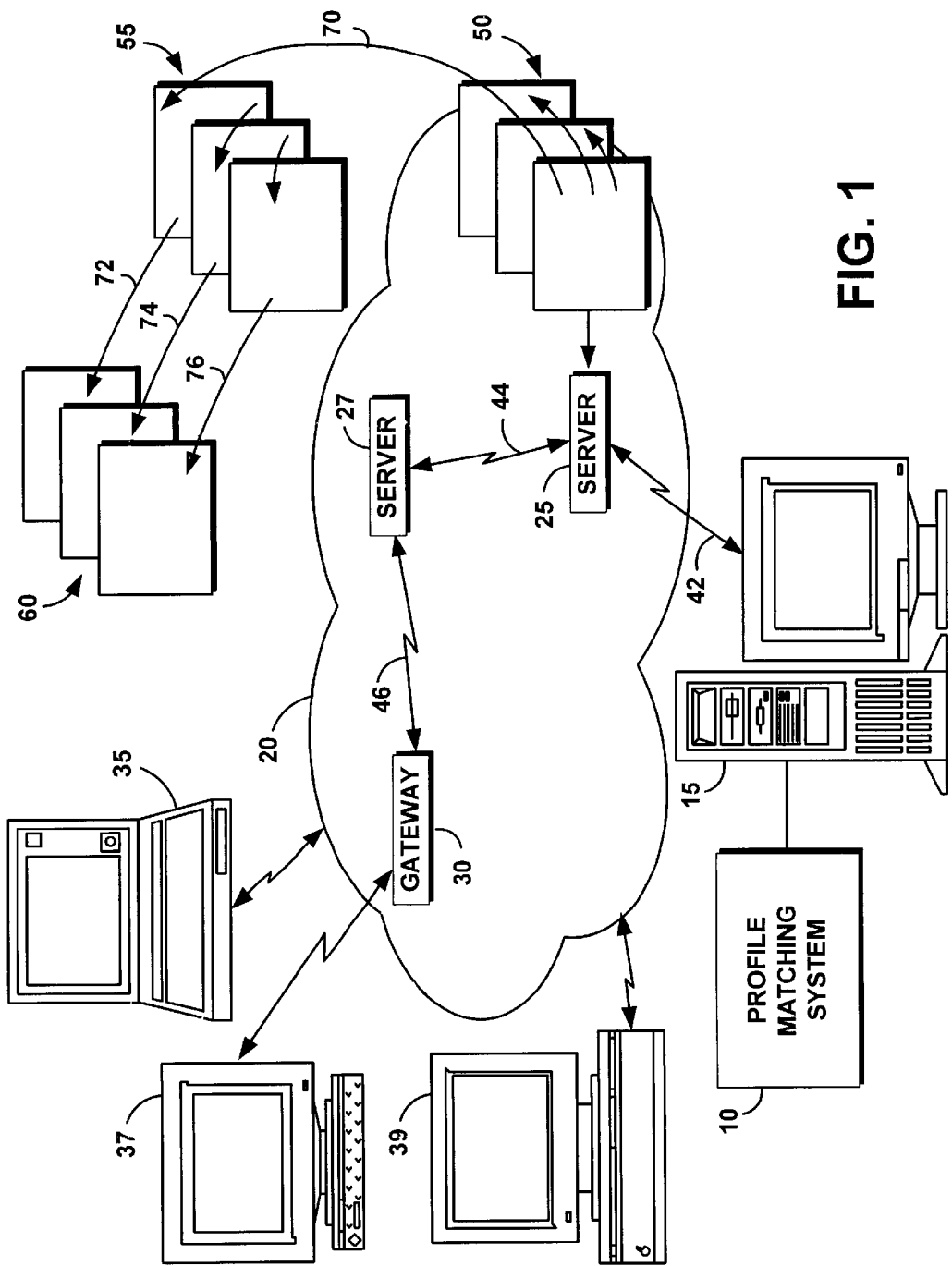
FIG. 1 is a schematic illustration of an exemplary operating environment in which a profile matching system of the present invention can be used.

The following definitions and explanations provide background information pertaining to the technical field of the present invention, and are intended to facilitate the understanding of the present invention without limiting its scope:

Crawler: A program that automatically explores the World Wide Web by retrieving a document and recursively retrieving some or all the documents that are linked to it.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

Internet: A collection of interconnected public and private computer networks that are linked together with routers by a set of standards protocols to form a global, distributed network.

Search engine: A remotely accessible World Wide Web tool that allows users to conduct keyword searches for information on the Internet.

Semi-structured: Implying a loose schema, or not conforming to a fixed schema.

Server: A software program or a computer that responds to requests from a web browser by returning ("serving") web documents.

URL (Uniform Resource Locator): A unique address that fully specifies the location of a content object on the Internet. The general format of a URL is protocol://server-address/path/filename.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client-server hypertext distributed information retrieval system.

FIG. 1 portrays the overall environment in which a profile matching system 10 according to the present invention may be used. The profile matching system 10 includes a software or computer program product that is typically embedded within, or installed on a host server 15. Alternatively, the profile matching system 10 can be saved on a suitable storage medium such as a diskette, a CD, a hard drive, or like devices. While the profile matching system 10 will be described in connection with the WWW, the profile matching system 10 can be used with a stand-alone database of terms that may have been derived from the WWW and/ or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the host server 15 for the desired information.

The host server 15 is connected to the network 20 via a communications link 42 such as a telephone, cable or satellite link. The servers 25, 27 can be connected via high speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
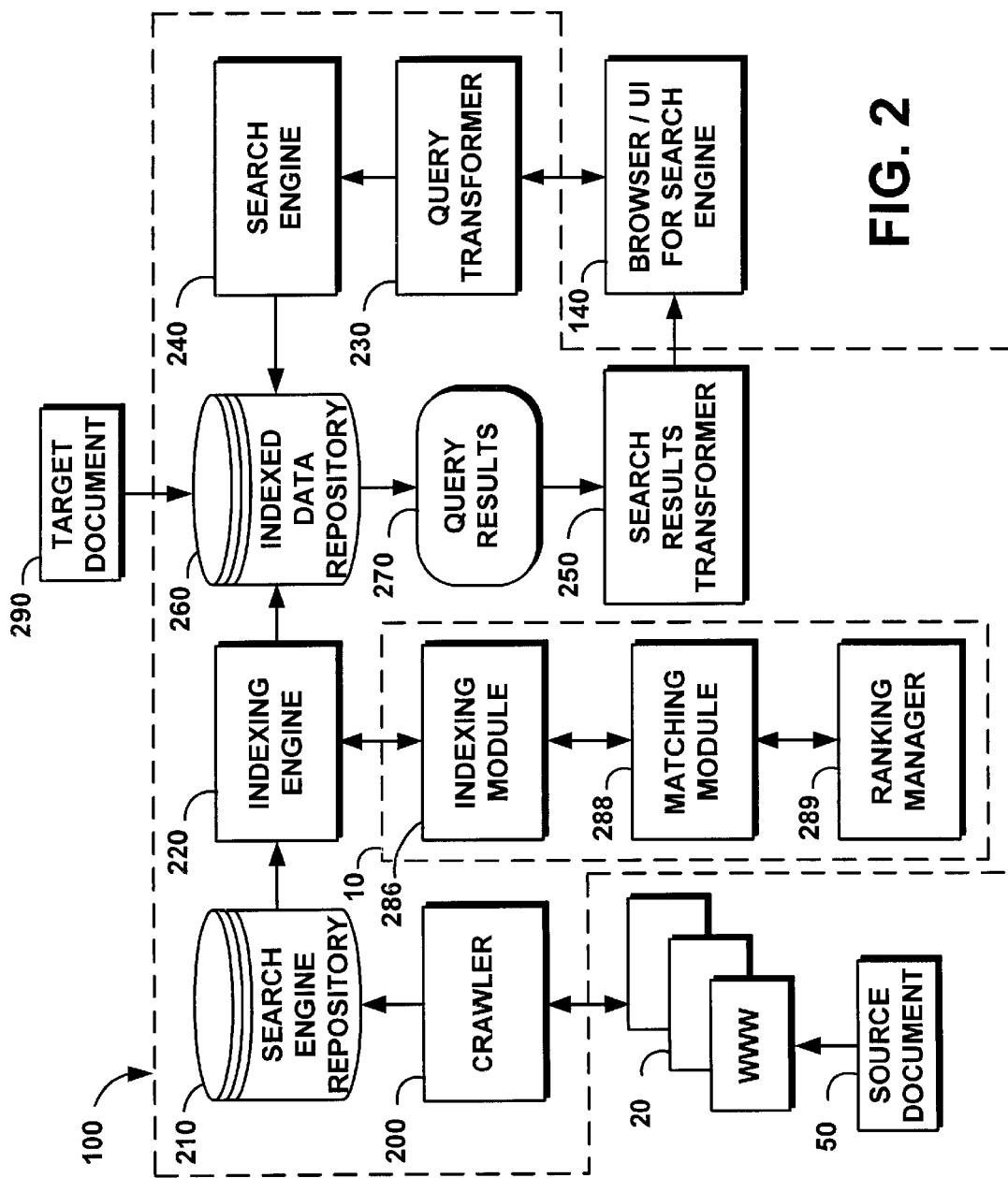
FIG. 2 is a block diagram that illustrates a high level architecture of the profile matching system of FIG. 1 shown used in the context of an Internet search.

The hypertext documents 50, 55, 60 can be represented as the WWW 20 in FIG. 2. Searches on the WWW are performed by the service provider 100 that generally comprises a web crawler 200, a search engine repository 210, an indexing engine 220, a query transformer 230, a search engine 240, a search results transformer 250, and an indexed data repository 260.

In use, the crawler 150 crawls the WWW 20 and downloads web documents to the search engine repository 210 where they are stored and updated systematically. The indexing engine 220 indexes the XML web documents, their document data types (DTDs), and the linking relationships for all of the indexed documents. The indexed data is stored in the indexed data repository 260 for later use by the search engine 240, as appropriate.

The search engine repository 210 is a data store maintained by a web information gatherer such as the web crawler 200. The search engine repository 210 maintains information or metadata from previously encountered web pages. This metadata is used by the indexing engine 220 to prepare the index. Preferably, the search engine repository 210 is maintained centrally by the search service provider 100.

Alternatively, the search engine repository 210 may be located and maintained on an independently provided system to which the search service provider 100 has access. In addition, while the profile matching system 10 is described as including two repositories 210 and 260, it should be clear these two repositories 210 and 260 could be functionally combined in a single database. The indexing engine 220 generates a description for each web document from the metadata stored in the search engine repository 210.

The query transformer 230, prompted by the user browser 140, applies a query request to the profile matching system 10, which, in turn, generates a search result with matches (or query results) 270 that are specific to the user's query. Once the profile matching system 10 retrieves the query results 270, the search service provider 100 transforms them into viewable form (i.e., HTML) that can be browsed by means of the query transformer 230. The transformed query results are subsequently presented to the user at the user interface (UI) or browser 140.

The profile matching system 10 is comprised of an indexing module 286 that maps a source document 50 and identifies its content attributes; and a matching module 288 that matches the source document content attributes to weighted elements, attributes, or indices of a target document stored in the indexed data repository 260.

The indexing module 286 uses predetermined map specification information to produce efficient indices (or path expressions) from the source document 50. The indexing module 286 also produces efficient indices from a target document 290. The matching module 288 is a driver, which, based upon the map specification information, navigates an index of the indexed data repository 260 and/or the index of the target document 290, to define matches between the target document 50 and the source document 290.

The matching module 288 uses a match specification language (MSL) and a match operator. Each rule in the MSL is a pair of path expressions: one for the source document 50 and one for target document 290. As an illustration, for a rule r in the MSL, a source path expression sr, a target path expression st, and a match operator m, a match occurs if m(sr, st)=true. In addition, each rule may have a weighting factor. The weighting factor specifies the weight of this rule against other rules in the specification file. The weighting factor can be a real number between 0 and 1. The matching module 288 processes the rule specification against the index files of the source and the target documents 50 and 290, respectively, and cumulatively weights the rule matches, and identifies an overall match criteria for each target document 290.

According to another embodiment of the present invention, the profile matching system 10 converts the schema of the source document 50 to that of the target document 290, in order to harmonize the schemas, thus facilitating the mapping and matching processes.

Figure 3:
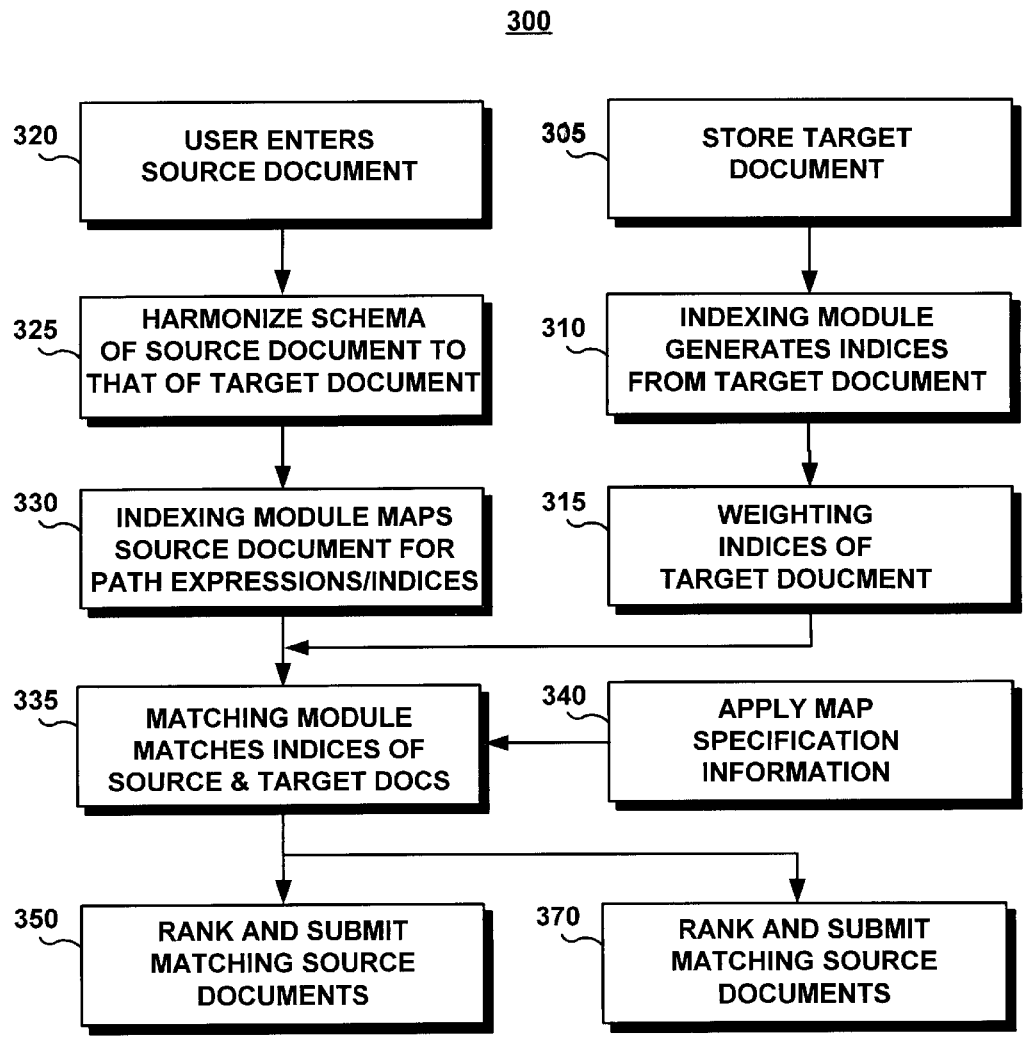
FIG. 3 is a flow chart that depicts the operation of the profile matching system of FIGS. 1–2.

FIG. 3 shows a more detailed description of a method of operation 300 of the profile matching system 10. Though the invention is described herein in the context of XML documents, it should be clear that other structured languages can, alternatively be used.

At step 305, the service provider 100 stores the target documents 290 in the indexed data repository 260 (FIG. 2), and the indexing module 286 generates indices from the target documents 290 at step 310. At step 315, the matching module 288 weights the indices of the targets documents and stores the same in the indexed data repository 260.

When the user enters a source document at step 320, the indexing module 286 can optionally harmonize the schema of the source document 50 to that of the target documents 290 at step 325. This harmonization process can be implemented, for example, by recognizing keywords in the source document 50 and rearranging the content of the source document 50 to best fit the schema of the target document 290. If the indexing module 286 determines that the schemas of the source document 50 and target documents 290 are substantially similar, the system 10 skips step 325 and proceeds to step 330.

At step 330, the indexing module 286 maps the source document 50 for indices or path expressions and extracts the same. Thereafter, at step 335, the matching module 288 matches the indices of the source document 50 which were retrieved at step 330 and the indices of the target documents 290 which were indexed at step 310 and weighted at step 315. Though in a preferred embodiment the matching module 288 matches only the indices as just described, it should however be understood that the matching module 288 may also match the entire source document 50 with the target documents 290 and/or their associated indices. Alternatively, the matching module 288 matches only the indices as just described, it should however be understood that the matching module 288 could match the target documents 290 with the entire source document 50 with and/or its associated indices.

In order to implement the matching process, the matching module 288 applies map specification information as described above (step 340). The matching module 288 generates and optionally ranks the desired matching documents by means of a ranking manager 289 (FIG. 2), at steps 360 and 370.

At step 360, the matching module 288 reproduces the matching source documents 50 (or links to these documents) based on a query from, for example, a customer who compiles the target documents 290. On the other hand, the matching module 288 reproduces the matching target documents 290 (or links to these documents) based on a query from the user who inputs the source document 50.

An exemplary use of the system 10 will now be illustrated in view of a specific example, whereby push technology or Grand Central Station technology (GCS) server software, employs user profiles to match clients with resumes posted from companies. A user uses an input device, such as a personal computer or a PDA, to enter personal data relevant to a job search, typically via a web browser application program, onto a job posting portal. The personal profile is textual data which is kept on a central web site and is continuously compared with job postings that are sent to the web portal from companies via the Internet.

The GCS server searches web servers on the Internet for relevant information, and also may directly receive input from companies, libraries, mail-order catalogs, publishing houses etc., to compile information for comparison checking with personal profiles.

The rationale behind web portals handling job resumes is described herein from the perspective of users, web site creators, and client companies. For clients and job seekers, job web-portals allow the possibility of maximizing exposure to desirable companies with minimal effort. It perhaps eliminates the need for frequent reading of the newspaper job columns, to be searching among colleagues for opportunities, and saves time. In general, submitting resumes to job web-portals is free, since the job web-portal accrues income according to the number of job seekers it has subscribed and does not want to discourage potential applicants. Job seekers can also multiply their effectiveness by filling in resumes at many job web-portals. Also resumes can be made available by candidates who may not be presently looking for a job but for whom the company could make a bid if the personal profile is marked as interested but perhaps not presently available.

Job web portal sites use their web site as a source of revenue by charging a client company a registration fee and a finder fee for every successful employee hired. The advertisers on the web site also pay a referral fee. The potential for income generation is very high in this model since there are many advantages for companies to broaden their search and to have a large pool of talent available, and so there is a great incentive for companies to participate. The attraction of a large pool of candidates is irresistible for a company. The job web-portal is simply contracted to do the search or the job web portal allows access in some limited way to the resumes from a company site.

From the perspective of the client company, the availability of a large candidate pool is highly attractive and allows the company to have a greater chance of success in finding the most suitable employees that fit their corporate culture as well as the technical requirements of the job. The search scheme is a lot simpler than the laborious process of generating newspaper advertisements, collecting applications, reading and appraising the pool of applicants. It is much simpler when it can all be handled on a computer.

Many web portals provide a personalized version of the portal, For instance, myYahoo® provides a personalized form of the Yahoo® portal, mycnn provides a personalized version of CNN® news. In an online job portal it is useful to provide a personalized facility for the user to store his or her resume, regularly update the resume, and send resumes to jobs that are newly posted.

Deficiencies in the way job portals handle resume matching arises from the fact that is it mostly a manual process. The portals have not heretofore completely succeeded to optimize matching other than generally by keyword searching. The approach in the profile matching system 10 is to optimize matching through parameterization or indexing of the relevant documents.

The profile matching system 10 provides a facility for users to submit resumes and log into the GCS system. Alternatively, resumes are resident on personal computers or PDAs, and subsequently scanned or downloaded as the GCS gatherer crawls the web. The user-specified resumes may be in HTML, text, word processing format, or some other format. The GCS recognizer system converts the resumes to a structured (or semi-structured) document, such as XML form with unified tag names like name, objective, education, skills, etc. Each tag has categories to qualify and rate the candidate resume. For, example the tag age may have categories of age ranges and entries of age brackets; the tag name may have categories of first name and last name; the tag education may have categories of level, grades, and school with appropriate entries etc.

The following is an exemplary resume:
Resume
Name: John Doe
Age: 23
Citizenship: USA
Education:
  BA (arts and sciences), University of California, Berkeley
High School:
  Oakland High School, graduated valedictorian 1995.
Skills:
  Proficient in Computer languages JAVA, PERL, HTML, XML.
  Knowledgeable in C++, BASIC, FORTRAN,
  Expert in UNIX operating system
Previous Employment:
  Summer 1995 Hewlett Packard
  Summer 1996 CISCO
  Summer 1997 CISCO
  Summer 1998 Intel
  Summer 1999 Microsoft
Salary minimum: 80 k
Benefits miminum: Medical
Options: none required
Shares: none required The GCS gatherer also collects company submitted and crawled job postings, or simply scans newspapers and company web sites to collect job postings. The job postings may also be in HTML, text, or any other form. The GCS recognizer converts these to a common XML form with tags such as job title, salary, company name location, job description, requirements etc.

In analogous fashion to analyzing the resume, the job posting is analyzed for tags and categories. Each job tag may have several categories of job name; a job grade with entries such as senior, junior; a tag skill may have categories of level with entries such as dexterous or none, and a category of computer with entries such as expert or beginner.

The following is an exemplary job posting:
Job Posting
Title: Software developer
Programming languages required: JAVA, C++, Pascal, COBOL
Operating system experience: UNIX, LINUX, Windows NT 4.0
Experience: 4 years of JAVA minimum
Location: Tucson
Vacation package: 15 days, 20 days 5+ years service, 25 days 10+ years service
Benefits: Full Medical, Dental, No vision
Options: 1000 futures
Shares: 500 shares
Salary: 90k–100k The profile matching system 10 may be defined as follows. It considers the resume schema and the job schema. For every attribute in the resume schema, it defines the attribute or set of attributes in the job schema that causes a match. The matching criteria are specified in a map specification file (MSF). The map specification file specifies how an executive recruiter may qualify for a particular job. This basically requires looking at important attributes of a job description and identifying if the job hunter has those attributes. The map specification describes this mapping information. The matching process itself includes an indexing component (or module 286) and a matching component (or module 288). The indexing component uses the map specification information to produce efficient indices from the "resume" XML document.

The following is an exemplary resume index document:

| The resume index document Efficient indices from indexing resume document | |
|---|---|
| <Education> | |
| Education: | BA |
| High School: | Oakland |
| <Skills> | <level> |
| C++: | 1 year |
| JAVA: | 2 years |
| PERL: | 3 years |
| XML: | 1 year |
| UNIX: | 6 years |
| LINUX: | None |
| C++: | 0.5 years |
| BASIC: | 10 years |
| FORTRAN | 11 years |
| WINNT4: | None |
| <Experience> | |
| Years | Summer only |
| <Benefits> | |
| Benefits Medical | YES |
| Benefits Dental | NO |
| Benefits Vision | NO |
| <Financial> | |
| Salary | 80k+ |
| Options | NO |
| Shares | NO |
| Location: | California |
| <negotiables> | |
| Salary | |
| Location | |
| Options | |

Another instance of the indexing component produces efficient indices from the "job" XML document.

The following is an exemplary job index document:

| The job index document Efficient Indices from Job posting: | |
|---|---|
| <Requirement> | <skill level> |
| Education | 4 year college |
| C++ | Expert |
| JAVA | Expert, 4 years minimum, |
| PASCAL | Expert |
| COBOL | Expert |
| UNIX | Expert |
| LINUX | Expert |
| WINNT4 | Expert |
| <Properties> | <details> |
| Location | Tucson, AZ |
| <HUMAN> | <details> |
| Medical | YES |
| DENTAL | YES |
| VISION | NO |
| Vacation | 15 days minimum |
| <financials> | <details> |
| Options | 1000 |
| Shares | 500 |
| Salary | 90k+ |
| <negotiables> | |
| location | |
| salary | |
| options | |

The matching component is a driver based upon the map specification file (MSF) that navigates the resume index document and the job index document and looks to see if there is a match. The MSF contains lines of code that may be defined according to many different schemes. This code is defined as a match specification language (MSL) as described earlier and repeated herein for ease of reference: Each rule in MSL is a pair of path expressions, one for source (the resume index document) and one for target (the job index document), and a match operator. For a given rule r, a source path expression sr, a target path expression st and a match operator m, a match occurs if m(sr, st)=true. In addition to this, each rule has a weighting factor. The weighting factor specifies the weight of this rule against other rules in the specification file. The weighting factor may be assigned a real number between 0 and 1.

The following are exemplary rules:
Exemplary Rules:
 <rule source="skills" target="requirement" match= "share" weight="0.5"/>
The matching process determines if the 'skills' tag in the resume and the 'requirement' tag in the job share a keyword called 'Java'. If such a match exists, it is given an overall weight of 0.5. Many levels of sophistication can be incorporated to give more weight to years of experience. For example:
 <rule source="JAVA" target="greater than 1 year" match="expand" weight="0.8"/>
 <rule source="salary minimum" target="salary minimum" match="exceed" weight="1.0"/>
 <rule source="location" target="location" match= "nearby" weight="1.0"/>
These factors can be multiplied together or added to determine the suitability of a candidate. After applying all the rules a candidate resume with a score higher than a minimum threshold is automatically selected for further review or simply sent an interview package.

Boolean logic and standard algorithmic techniques can be applied using MSL. For example if locations of the job resume and posting do not correspond but one of the documents indicates flexibility then this can be given a positive score. A sample rule could be:

<rule source="location" target="location" match="not nearby" weight="1.0"/>
    <OR>
    <rule source="location" source="negotiable" match="identity" weight="1.0"/>
    <OR>
    <rule target="location" target="negotiable" match="identity" weight="1.0"/>.

The interpreter for the rule language can be written in a number of different lexical programming languages, with PERL probably being the simplest. The matching process basically processes the rule specification against the index files of the source and the target documents, and cumulatively weights the rule matches, and identifies an overall match criteria for each target document.

A useful outcome of the use of a MSF file incorporating a MSL language is that parameterized resumes may be stored in a condensed form and tabulated or indexed. A similar table may be constructed for job postings. This tabulated or parameterized form of storing resumes and postings significantly simplifies the matching process once new resumes and postings are added since the new documents may be inserted as rows in a table where the best match occurs. In this manner computation time is minimized.

In a typical usage scenario a user submits his/her resume to the GCS website. The matching algorithm matches the resume using the match specification file (MSF) against all job postings available. As new job postings arrive the match process incrementally matches them up. As new resumes come in, the match process matches it against existing job postings. Every time the user logs into the system, the system shows him/her the top matched job postings at that point. Alternatively, the user is informed by push technology or email concerning matches.

The profile matching system 10 can display the matching documents based upon what job postings the user has already seen, or what listing specification the user prefers, such as salary, location, benefits, shares etc. Any of the standard selection or editing criteria can be applied to a graphical user interface (GUI) viewing mechanism for the matches, such as deletion, reply to, save, etc. The user can specify threshold of response such as "respond to highest salary job posting", respond to any job within one mile of where I live" etc.

The profile matching system 10 also can help the user to tailor the resume to a particular job posting based upon points of weakness or slight mismatch. For small differences between resume and job posting it may be possible to suggest resume alteration to the user which would qualify him or her for the job. This can be achieved by manipulating the rules of the MSL to identify these mismatches and alerting the user. Large differences, which would be probable cause for irreconcilable compatibility between resume and posting, would of course create no communication with the user.

The match process can be further enhanced with the user specifying tuning parameters to the match specification. It may be permitted to the user to specify ranges of attributes that would satisfy him/her in a resume such as a variety of locations, and a variety of salaries associated with those locations. Perhaps a more ideal location would prompt him/her to accept a lower salary. It is not necessary for a job posting or client company to know anything about the flexibility of the user resume since they might give away too much information. It would suffice for the client company to know that there was a match and under what conditions in order to decide whether to continue to an interview process.

The following represents another application for the profile matching system 10 in the context of antique (or object) searching. The profile matching system 10 provides a general facility for users to submit search documents, log into the GCS system, and await return of information matching new data submitted to the web of interest to them or to exchange information or barter, with other users on shared topics of interest. This can be done in a manner analogous to the job resume task described above and can be applied to business topics such as new magazines, instruments, car parts, etc. It can also be used to search for the best price or deal on a given article or item of interest such as antique furniture, work of art etc. Users could compose their own search documents to correspond to a generic master search language whose interpreter is resident in GCS. Each search document they submit is like a personal profile for which GCS constructs a parameterized list and includes in a search. As an alternative, the search documents are resident on personal computers, or PDAs are and subsequently scanned or downloaded as the GCS gatherer crawls the web. The user-specified search documents may be in whatever format the GCS recognizer can understand. The GCS recognizer converts the search documents to an XML form with unified tag names taken from a broader language than just resumes. These can include vocabulary simply taken from a dictionary as a source. Even this may seem to complicate matters for computation of matches, it should be possible within each field of application of search (such as works of art) to use a limited vocabulary. Each tag has categories to qualify and rate the candidate search document. For example, the tag antique table may have categories of leg with entries such as Jacobian or French.

The following is an exemplary search document for antiques:

Search Document for Antiques

Name:John Doe

Area of interest: Antique Furniture

Type: Original only

Pieces of interest: Table, chair, chaise, secretariat, bureau

Styles: Jacobian, French, Late English, Georgian, Queen Anne, Pavillion, Camille Century: 1700s The GCS gatherer on server collects company submitted and crawled postings of their wares, or scans company web sites, newspapers, magazines and publications for relevant data. The recognizer interprets the data and makes it available for analysis as a found article document. The GCS recognizer converts these to a common XML form with tags such as manufacturer, period, style, what kind of furniture piece, price, company name location, description, etc. In analogous fashion to analyzing the search document, the information retrieved from the web is analyzed for tags and categories. Each furniture piece tag may have several categories, for example, manufacturer may have entries such as English, French etc.; a condition category may have entries such as perfect, good etc.; a category of wood type may have entries such as mahogany, teak etc.

An example of a retrieved document from an antique seller could be as follows:
Antique Furniture Sale Document
Title: French Table
Manufacturer: Orsay
Condition: excellent
Wood: Mahogany
Year: 1788
Style: Jacobian
Picture: (GIF)

The profile matching module 288 may be defined in a manner directly analogous to the job resume matching as follows. It considers the search document schema and the found article document schema. For every attribute in the search document schema, it defines the attribute or set of attributes in the found article schema that cause a match. The matching criteria are specified in a map specification file. The map specification file specifies how a found article may match a user specified search item. This requires looking at important attributes of a found article description and identifying if the found article has those attributes. The map specification describes this mapping information. The matching process itself consists of an indexing component and a matching component. The indexing component uses the map specification information to produce efficient indices from the "search document" XML document.

The following is an exemplary search index document:

| The search index document |  |
|---|---|
| Efficient indices from indexing search document | |
| <Area> | |
| Antiques | |
| <Subarea> | |
| Furniture | |
| <Type> | |
| Object | Table |
| Styles | Jacobian, French, Late English, Georgian, Queen Anne, Pavillion, Camille |
| Date | 1700–1800 |
| ManufacturerOriginal | |
| ReproductionNo | |
| Condition | at least good |
| Price | no more than $10000 |

Another instance of the indexing component produces efficient indices from the "found article" XML document. The following is an exemplary found article index document:
The Found Article Index Document
Efficient Indices from Found article posting:
Title: French Table
Manufacturer: D'oleil
Condition: good
Wood: Mahogany
Year: 1788
Style: Jacobian
Picture: (GIF)

The matching software is a driver based upon the map specification file (MSF) that navigates the search document index document and the found article index document and determines if there is a match. Some example rules for determining matches could be as follows:
Example Rules:
    <rule source="antique" target="antique" match="category" weight="1.0"/>
    <rule source="furniture" target="type" match="share" weight="0.5"/>
    <rule source="country" target="french" match="must" weight="1.0"/>
    <rule source="style" target="jacobian" match="option" weight="0.5"/>

The matching process checks the tags in the search index document and the found article index for keywords antique and table. After this match, the score is assembled from other optional and required fields to arrive at a number which can be used as a target to determine the positive or negative interest on the part of the user. Many levels of sophistication can be incorporated to give a variety of weights to the antiquity of the object and the quality by giving more weight to well preserved pieces. For example:
    <rule source="condition" target="good" match="minimum" weight="1.0"/>

These factors can be multiplied together or added to determine the suitability of a candidate antique piece. After applying all the rules a candidate search document with a score higher than a minimum threshold could be automatically selected for further review. Boolean logic and standard algorithmic techniques can be applied using MSL. For example, if the condition of the found article search document and posting do not correspond exactly but one of the documents indicates a suitable price range then this can be given a positive score. A sample rule could be:
    <rule source="condition" target="fair" match="minimum" weight="1.0"/>
    <OR>
    <rule source="price" target="price" match="<10000" weight="1.0"/>.

As in the job posting situation the GCS also can help the user to tailor the search document to a particular found article document based upon points of weakness or slight mismatch. For small differences between search document and found article document it may be possible to suggest search document alteration to the user which would qualify his specifications with the found article document. This can be achieved by manipulating the rules of the MSL to identify these slight mismatches and alerting the user.

The matching process can be further enhanced if the user specifies tuning parameters to the match specification. It may be permitted to the user to specify ranges of attributes that would satisfy him/her in a search document such as a variety of locations of origin of the found article, or antique conditions. It is not necessary for a found article owner or client company to know anything about the flexibility of the user since this might give away too much information in price negotiations. It would suffice for the client company to know that there was a match and under what conditions in order to determine selling conditions.

The application of the profile matching system 10 to an antique search illustrates the generality of the technique for matching searches and documents on the web, provided the information retrieved by the GCS is parameterized to accommodate this type of identification of user and seller, or searcher and seeker. It can be easily envisioned that this technique can be applied to many personal and business interests. Personal interest in esoteric sports, hobbies, books and publications, jobs, computers, historical documents, videotapes etc., can be parameterized and searched for using a generic MSL language specification.

It is to be understood that the specific embodiments of the invention that have been described are merely illustrative of certain application of the principle of the present invention. Numerous modifications may be made to profile matching system 10 described herein without departing from the spirit and scope of the present invention. For example, while the present invention is described for illustration purpose only in relation to the WWW, it should be clear that the invention is applicable as well to databases and other tables with indexed entries.

What is claimed is:

1. A method of dynamically performing an interactive bidirectional profile matching between a plurality of source documents and a plurality of structured target documents, comprising:

extracting an index from each of the structured target documents, the index containing a plurality of elements;

identifying a schema for the index;

assigning weighting values to the elements of the index;

mapping path expressions in the plurality of source documents;

for at least some of the structured target documents, matching the path expressions in the plurality of source documents to the index from each of the structured target documents, according to the index schema;

as a new target document is added, automatically identifying an index schema for the new target document, and incrementally matching the index schema for the new target document to the path expressions in the plurality of source documents, according to the index schema of the new target document; and as a new source document is added, automatically mapping a new path expression for the new source document, and incrementally matching the new path expression to the index from each of the structured target documents, according to the index schema of each of structured target documents, for dynamically performing the interactive directional profile matching.

2. The method according to claim 1, further comprising converting at least some of the plurality of source documents to structured documents having a document schema that corresponds substantially to the index schema.

3. The method according to claim 2, wherein for every attribute in the index schema, defining an attribute in the document schema that results in a match.

4. The method according to claim 1, wherein matching the path expressions comprises specifying matching criteria specified in a map specification file.

5. The method according to claim 4, further comprising using the map specification file to produce efficient indices from the plurality of source documents.

6. The method according to claim 1, wherein matching comprises using a match specification language (MSL) and a match operator.

7. The method according to claim 6, wherein using a match specification language comprises, for each rule in the match specification language specifying a pair of path expressions: one path expression for the plurality of source documents and one path expression for the index.

8. The method according to claim 1, wherein the plurality of structured target documents comprise a semi-structured target document.

9. The method according to claim 1, wherein the plurality of structured target documents comprise a structured target document.

10. The method according to claim 1, wherein the index contains a plurality of elements; and further comprising assigning weighting values to the elements of the index.

11. A system for dynamically performing an interactive bidirectional profile matching between a plurality of source documents and a plurality of structured target documents, comprising:

an indexing module for extracting an index from each of the structured target documents, the index containing a plurality of elements;

the indexing module identifying a schema for the index and assigning weighting values to the elements of the index;

a mapping module for mapping path expressions in the plurality of source documents;

for at least some of the structured target documents, a matching module for matching the path expressions in the plurality of source documents to the index from each of the structured target documents, according to the index schema;

as a new target document is added, the indexing module automatically identifies an index schema for the new target document, and the matching module incrementally matches the index schema for the new target document to the path expressions in the plurality of source documents, according to the index schema of the new target document; and as a new source document is added, the mapping module automatically maps a new path expression for the new source document, and the matching module incrementally matches the new path expression to the index from each of the structured target documents, according to the index schema of each of target documents, for dynamically performing the interactive bidirectional profile matching.

12. The system according to claim 11, wherein the plurality of structured target documents comprise an XML document.

13. The system according to claim 11, wherein the matching module matches the path expressions in the plurality of source documents by specifying matching criteria specified in a map specification file.

14. The system according to claim 13, wherein the matching module uses the map specification file to produce efficient indices from the documents.

15. The system according to claim 14, wherein the matching module uses a match specification language (MSL) and a match operator; and wherein for each rule in the match specification language the matching module specifies a pair of path expressions: one for the documents and one for the index.

16. The system according to claim 11, wherein the plurality of structured target documents comprise a semi-structured target document.

17. The system according to claim 11, wherein the plurality of structured target documents comprise a structured target document.

18. The system according to claim 11, wherein the index contains a plurality of elements; and wherein the indexing module assigns weighting values to the elements of the index.

19. A computer program product having instruction codes for performing an interactive bidirectional profile matching between a plurality of source documents and a plurality of structured target documents, comprising:

a first set of instruction codes for extracting an index from each of the structured target documents, the index containing a plurality of elements;

a second set of instruction codes for identifying a schema for the index and for assigning weighting values to the elements of the index;

a third set of instruction codes for mapping path expressions in the plurality of source documents;

a fourth set of instruction, which for at least some of the structured target documents, matches the path expressions in the plurality of source documents to the index from each of the structured target documents, according to the index schema;

as a new target document is added, the second set of instruction codes automatically identifies an index schema for the new target document, and the fourth set of instruction codes incrementally matches the index schema for the new target document to the path expressions in the plurality of source documents, according to the index schema of the new target document; and as a new source document is added, the third set of instruction codes automatically maps a new path expression for the new source document, and the fourth set of instruction codes incrementally matches the new path expression to the index from each of the structured target documents, according to the index schema of each of structured target documents, for dynamically performing the interactive bidirectional profile matching.

20. The computer program product according to claim 19, further comprising a fifth set of instruction codes for converting at least some of the plurality of source documents to structured documents having a document schema that corresponds substantially to the index schema.

21. The computer program product according to claim 20, wherein for every attribute in the index schema, a sixth set of instruction codes defines an attribute in the document schema that results in a match.

22. The computer program product according to claim 19, wherein the fourth set of instruction codes specifies matching criteria specified in a map specification file.

23. The computer program product according to claim 22, wherein the fourth set of instruction codes uses the map specification file to produce efficient indices from the plurality of source documents.

24. The computer program product according to claim 19, wherein the fourth set of instruction codes uses a match specification language and a match operator.

25. The computer program product according to claim 24, wherein for each rule in the match specification language, the fourth set of instruction codes specifies a pair of path expressions: one path expression for the plurality of source documents and one path expression for the index.

26. The computer program product according to claim 19, wherein the plurality of structured target documents comprise a semi-structured target document.

27. The computer program product according to claim 19, wherein the plurality of structured target documents comprise a structured target document.

28. The computer program product according to claim 19, wherein the index contains a plurality of elements; and wherein the second set of instruction codes further assigns weighting values to the elements of the index.

29. A system for performing an interactive bidirectional profile matching between a plurality of source documents and a plurality of structured target documents, comprising:

means for extracting an index from each of the structured target documents, the index containing a plurality of elements and for assigning weighting values to the elements of the index;

means for identifying a schema for the index;

means for mapping path expressions in the plurality of source documents;

for at least some of the structured target documents, means for matching the path expressions in the plurality of source documents to the index from each of the structured target documents, according to the index schema;

as a new target document is added, the identifying means automatically identifies an index schema for the new target document, and the matching means incrementally matches the index schema for the new target document to the path expressions in the plurality of source documents, according to the index schema of the new target document; and as a new source document is added, the mapping means automatically maps a new path expression for the new source document, and the matching means incrementally matches the new path expression to the index from each of the structured target documents, according to the index schema of each of structured target documents, for dynamically performing the interactive bidirectional profile matching.

30. The system according to claim 29, further comprising means for converting at least some of the plurality of source documents to structured documents having a document schema that corresponds substantially to the index schema.

31. The system according to claim 30, wherein for every attribute in the index schema, means for defining an attribute in the document schema that results in a match.

32. The system according to claim 29, wherein the matching means specifies matching criteria specified in a map specification file.

33. The system according to claim 32, wherein the matching means uses the map specification file to produce efficient indices from the plurality of source documents.

34. The system according to claim 29, wherein the matching means uses a match specification language and a match operator.

35. The system according to claim 34, wherein for each rule in the match specification language, the matching means specifies a pair of path expressions: one path expression for the plurality of source documents and one path expression for the index.

36. The system according to claim 29, wherein the plurality of structured target documents comprise a semi-structured target document.

37. The system according to claim 29, wherein the index contains a plurality of elements; and wherein the identifying means further assigns weighting values to the elements of the index.

* * * * *